3,283,049
PROCESS FOR MAKING REFRACTORY BRICK
John M. O'Donnell, San Francisco, Calif., and Richard O. Platt, Bethel Park, and Charles D. Gabor, Verona, Pa., assignors to Harbison-Walker Refractories Company, Pittsburgh, Pa., a corporation of Pennsylvania
Filed Apr. 12, 1965, Ser. No. 447,260
2 Claims. (Cl. 264—121)

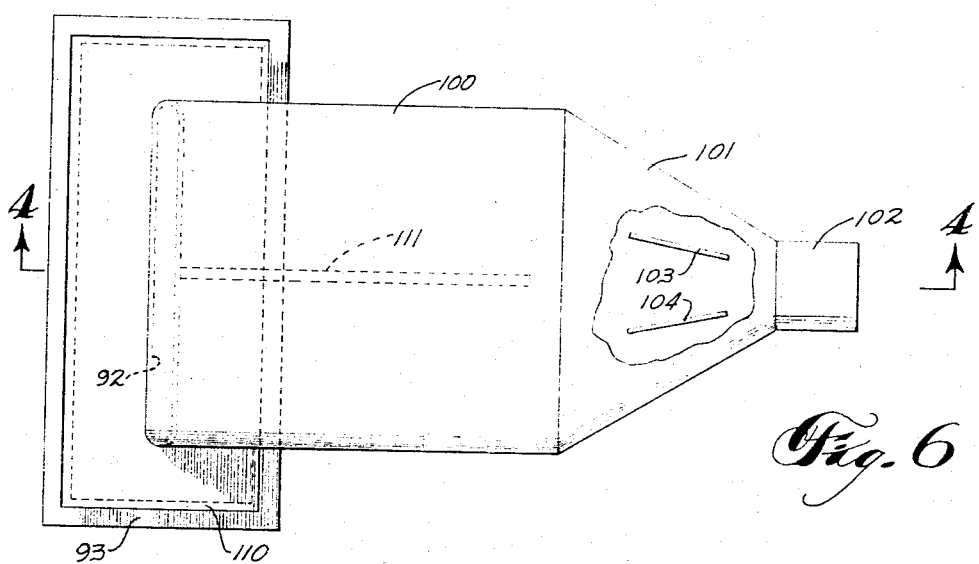
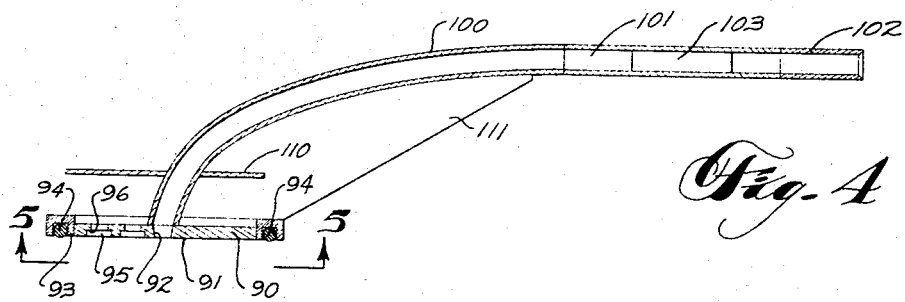
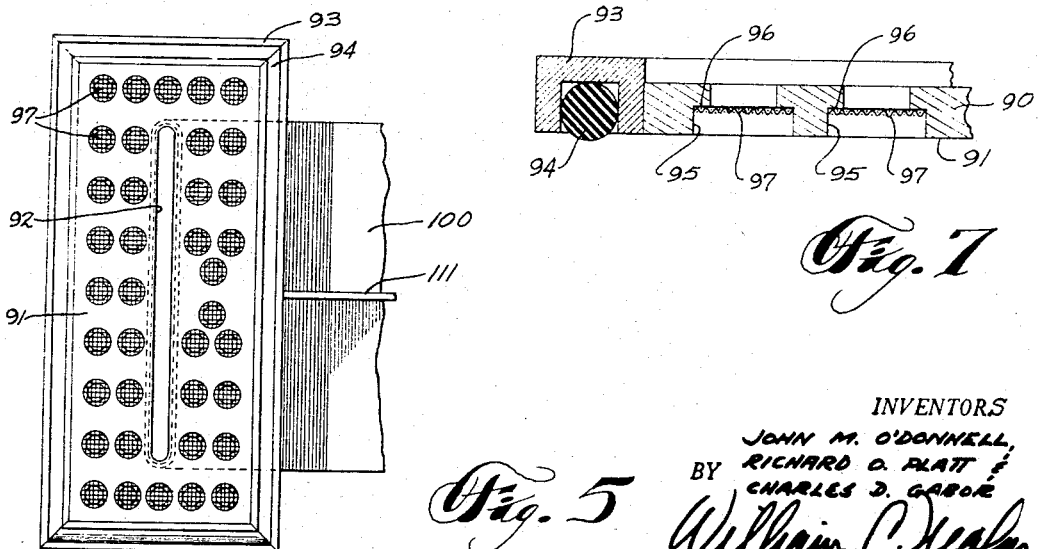

This application is a continuation-in-part of application Serial No. 261,654, now United States Patent 3,187,401, filed February 28, 1963 entitled Making Brick.

This invention relates to the manufacture of brick and more particularly to methods for fabrication of a plurality of refractory brick characterized by uniformity of strength.

In operating metallurgical furnaces and the like, such as a steelmaking open hearth furnace, the overall hot strength of the roof and its resistance to cracking and peeling may depend not so much on the average strength of the roof brick, as on the strength of a few of the weakest brick scattered through the roof. For example, tests have shown that an increase in bulk density for brick from 182 to 195 p.c.f. about doubled the strength of the brick at room temperature, i.e. 680 to 1290 p.s.i. In a sustained load test at 2700° F., the increase in density changed the time to fail from 2 hours to 116 hours. It, thus, appears desirable to assure uniformity of density in order to obtain predictable and uniform minimum strength in a group of brick or like refractory shapes, which are used to fabricate a furnace structure.

Accordingly, it is an object of this invention to provide a method for producing brick of a given raw material, which brick are characterized by substantially uniform density and strength.

Briefly, according to one aspect of the invention, there is provided apparatus for modification of a brick press, whereby brick of substantially uniform density and strength can be obtained from a given batch mixture. An example of a mechanical brick press, which can be modified according to this invention, is shown, for example, in United States Patent No. 987,124. This is sometimes called a Boyd-type press. The apparatus of this invention includes means arranged to deliver accurately weighed quantities of granulated brick material to a pneumatic charging system. The pneumatic system conveys the accurately weighed amount of material to the brick press mold cavity.

Other objects and further features and advantages of the invention will become apparent to those skilled in the art from a study of the following detailed description, with reference to the drawings. In these drawings:

FIG. 4 is a side elevation, in partial section, of an alternative discharge head for the feed system of FIG. 2;

FIG. 5 is a bottom plane view, partially broken away, of the discharge head of FIG. 4;

FIG. 6 is a top view of the discharge head of FIG. 4; and

FIG. 7 is an enlarged fragmentary sectional detail of a portion of the discharge head of FIG. 4.

Before describing the drawings in detail, it should be understood they are but exemplary of one manner of practicing this invention, and arrangements other than those specifically shown may be used which are within the scope of the invention.

Figure 1:
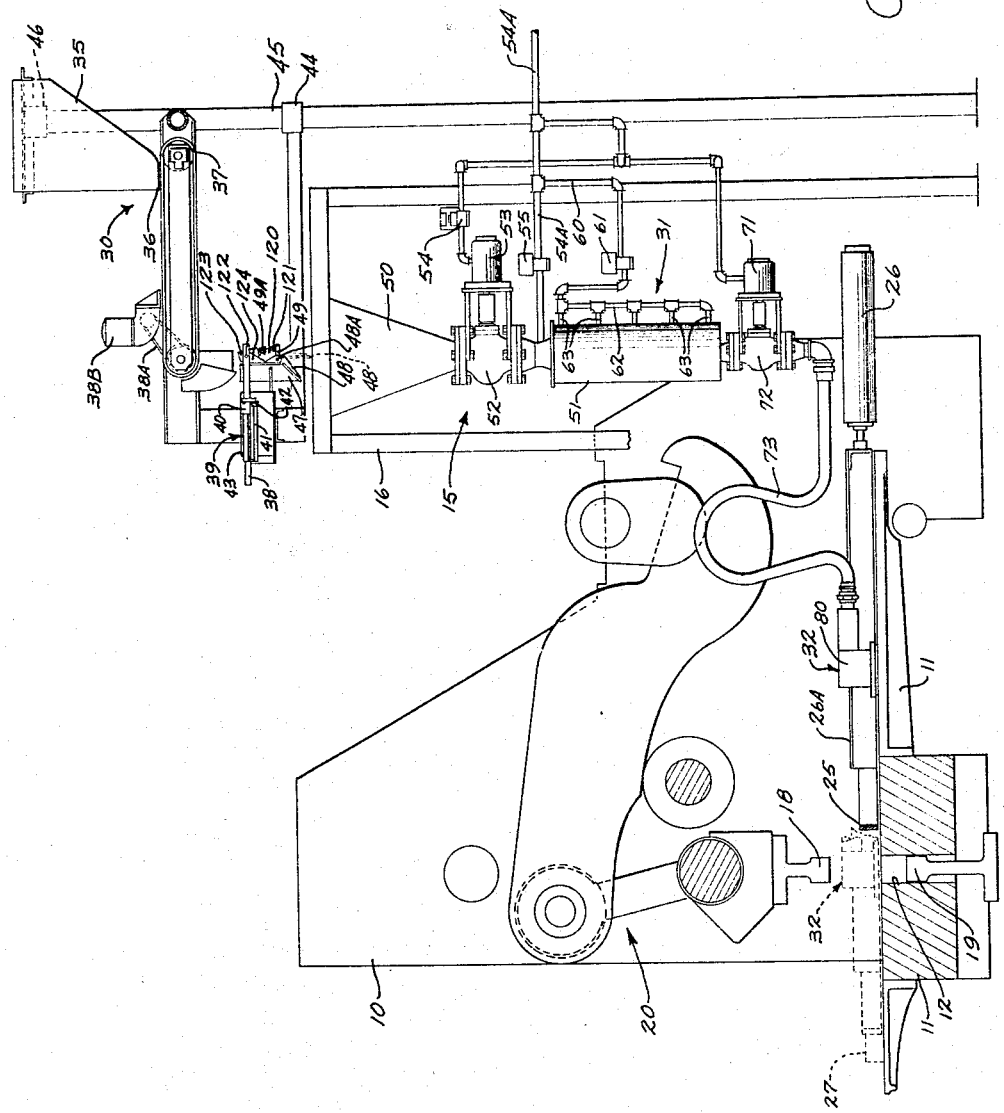
FIG. 1 is a side elevation in partial section, with some parts broken away in order to better show cooperation between parts, of apparatus according to this invention when used with a hydraulic press.

Those portions of a Boyd-type mechanical brick press which are shown in FIG. 1, include a frame 10 adjacent the lower and front part of which the work table 11 is rigidly mounted. The table is provided with a rectangular molding cavity 12 that extends completely through it.

At the back of the table is a feed arrangement 15 according to this invention. The feed arrangement is supported on suitable angle iron framework 16 attached as by welding or the like to the frame 10 of the press or by bolting to the floor, etc. Top and bottom pressure plates 18 and 19 are aligned with the cavity 12. These plates are arranged for reciprocal and opposed travel, whereby a batch of brickmaking material may be compressed within the cavity 12 to form a brick. The system of links and arms 20 is conventional in a Boyd-type press, and is interconnected with suitable sources of drive power and the like (which are not shown in the drawings since they are conventional and well known) to correlate travel of the pressure plate 18 with travel of the pressure plate 19 in forming brick. This system is so arranged that, after compression of a batch, the bottom pressure plate 19 lifts a brick 27 to the table 11, and the brick pusher 25, under the influence of the cylinder 26, moves a finished brick 27 onto the forward lip of table 11 for removal. The pusher 25 is connected to cylinder 26 through the elongate frame member 26A.

The feeding system 15 is generally comprised of 3 parts; namely, the batch weigher 30, the pneumatic feeder 31, and the discharge head 32.

The weigher 30 is comprised of a first hopper 35 having downwardly converging walls which terminate in a bottom discharge 36 positioned a slight distance above the upper surface of the endless conveyor 37. A scale beam 38 carries an elongate blade 39 along which the weight 40 may be positioned as desired. A small blade 41 is carried by the larger one and is arranged to receive small weights 42 for fine scale adjustment. The weighing unit 43 carries the scale beam in a conventional manner and is, itself, supported by clamp 44 on the post 45. The hopper 35, through its clamp 46, is likewise rigidly held on the post 45.

Positioned beneath the discharge of the conveyor 37 to the left of weighing unit 43 is a second hopper 47. The pivotally interconnected spring biased link arms 49 and 49A, hold the flap 48 to normally close the bottom discharge of hopper 47. This type of apparatus is available, commercially. Its detailed operation is known and understood by those in the material handling art and its operation will, therefore, be but tersely described herein. In essence, a head of granulated material is maintained in the hopper 35. The conveyor is driven through belt 38A by motor 38B, and gradually removes a windrow of material of substantially uniform dimensions from the bottom of the hopper 35. This windrow of material discharges into the hopper 47 to fall on the baffle or flap 48. The flap 48 is rigidly connected to link 49 to form a bell crank arrangement provided at 48A. The weight of material on flap 48 reacts against spring 120. The bottom of spring 120 bears against collar 121 carried by link 49A. The upper end of link 49A is encompassed within slotted housing 123 and is pivotally connected by pin 122 to the scale beam 38. The housing 123 is fixed to bracket 124 which is carried by the hopper 47.

Thus, when sufficient material rests on flap 48 to overcome the resistance of spring 120, the link 49A is moved upwardly, its pivot pin 122 commensurately moves in the slots formed through housing 123, and force is exerted on beam 38. This force is resisted by weights 40 and 42. Initial movement of beam 38 is sensed by weighing unit 43. The weighing unit includes a conventional rheostat which is connected to electric motor 38B. Initial movement of the beam causes the rheostat to slow the motor.

When the desired weight of material rests on flap 48 and the beam is moved to maximum deflection, the rheostat shuts off the motor. The measured and exact weight of material is discharged from the hopper 47 and falls into the hopper 50 as flap 48 opens. The weighed material remains in the receiving hopper 50 until the pressure chamber 51 is ready to receive it. At a given time, which may be when a brick 27 has been moved to table 11 by pusher 25 and the discharge head 32 is over cavity 12 (as shown in dotted lines in FIG. 1), the plug valve 52 is opened by the rotary valve opener 53 and material falls from hopper 50 into chamber 51. The valve opener 53 may be such as the commercially available Rotac Model HN–36–2V rotary valve opener. The four-way valve 54 controls the operation of the rotary valve opener 53.

Compressed air, at approximately 60 to 80 p.s.i., is introduced into the pressure chamber 51 directly through the line 54A by opening of the valve 55. Commensurate with flow of air to pressure chamber 51, air is introduced through the line 60 and valve 61 to the conduit 62. The equispaced headers 63, opening in parallel from the conduit 62, introduce compressed air at, for example, 60 to 80 p.s.i. into the chamber 59 (see FIG. 2 which is defined by the outer jacket 64 and the exterior of the tubular member 65 which in turn defines the pressure chamber 51. Chamber 59 communicates with pressure chamber 51 through the plurality of small holes 51A (on the order of ⅛″ diameter for the holes) drilled through the member 65, peripherally of pressure chamber 51. This air serves as a cushion along the inner walls of the member 65, and reduces frictional contact between it and granulated brick material therein. The pressurized air atmosphere in chamber 51 assists and assures forceful expulsion of contained granular material through bottom outlet 66 when valve 72 is opened.

After pressure in chamber 51 has built up the desired 60 to 80 p.s.i., the air supply is shut off by closing valves 55 and 61. The pressure chamber is now in a ready condition, and contains a precisely weighed quantity of granulated brickmaking material.

After the press has finished making a brick and it has been removed by pusher 25, the discharge head 32 is over the cavity 12. When discharge head 32 is so positioned, rotary valve opener 71, similar to the valve opener 53, opens the plug valve 72 located beneath the pressure chamber outlet 66 and granulated brickmaking material is blown through plug valve 72, flexible conduit 73 to the discharge head 32, and thence to the cavity 12. Excess air is vented from the cavity 12 through the screen-covered discharge head openings 75.

The discharge head 32 includes a generally box-like element 80 having a plate 81 attached across its open bottom. A pair of inner walls 82 and 83 slope downwardly from points intermediate respective opposed inner sidewalls of the box 80, in such a manner as to cooperate with the downwardly curved member 84 to discharge material through slot 85 formed through plate 81. The periphery of plate 81 is channel-like, in order to receive the flexible seal 86. Valve 72 closes; pressure chamber 51 is vented as by opening valve 52, and a new batch of granulated brick material is allowed to enter the chamber 51 from hopper 50 as the next charge.

It should be understood that the valves, discussed above, can all be manually operable. However, I prefer they be automatically operable as, for example, tied into a master control console (not shown) readily accessible to a press operator where he, by mere pressing of a button or drawing of a switch, can operate the various valves. Such automatic valving systems are well known and commercially available and are, therefore, not described in detail herein.

Figure 2:
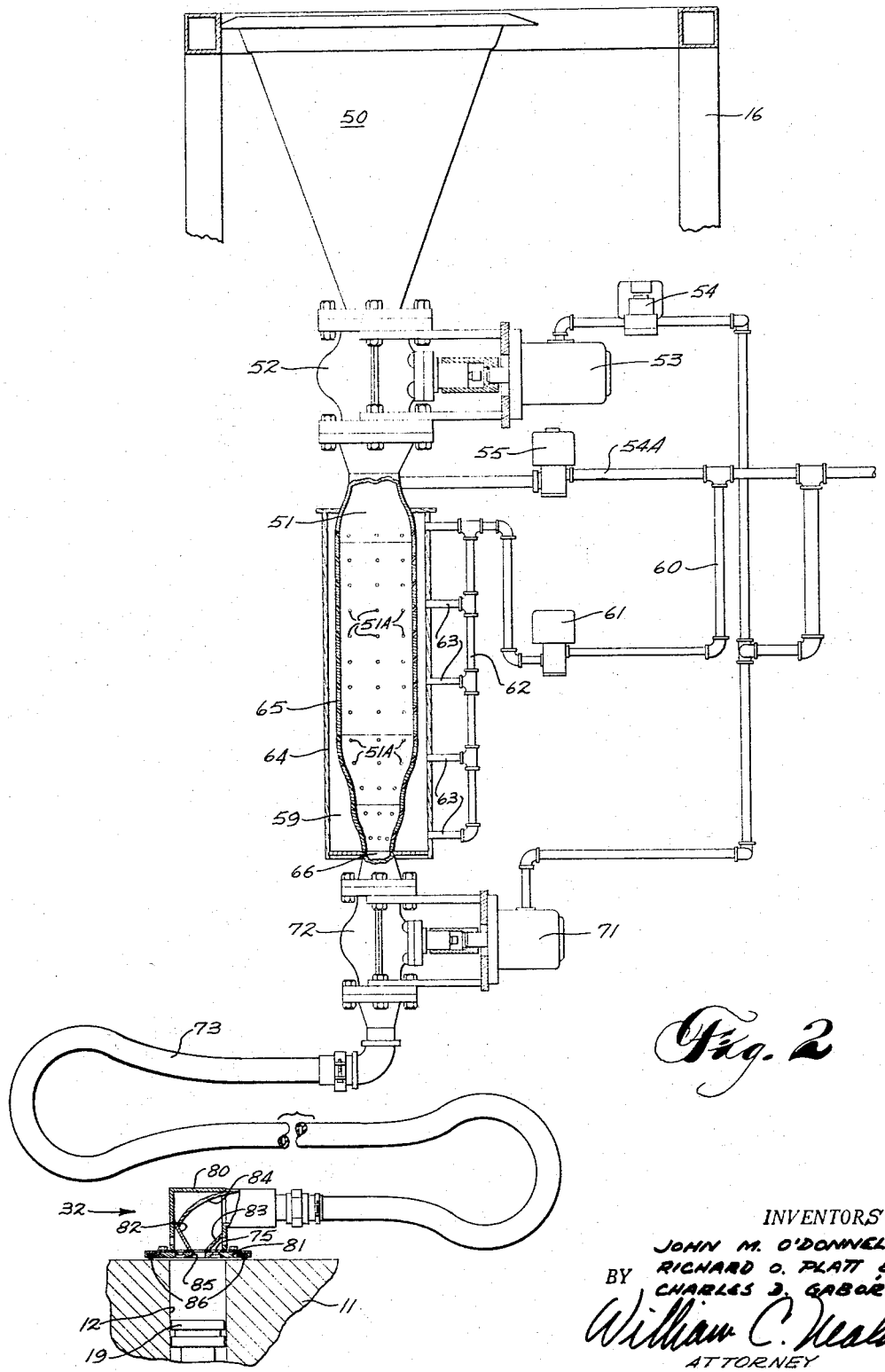
FIG. 2 is an enlarged detail, in partial section, of the feed arrangement of FIG. 1.

The discharge head, of FIGS. 1 and 2, is satisfactory, but a preferred construction is shown in FIGS. 4 through 7 and discussed below.

Figure 3:
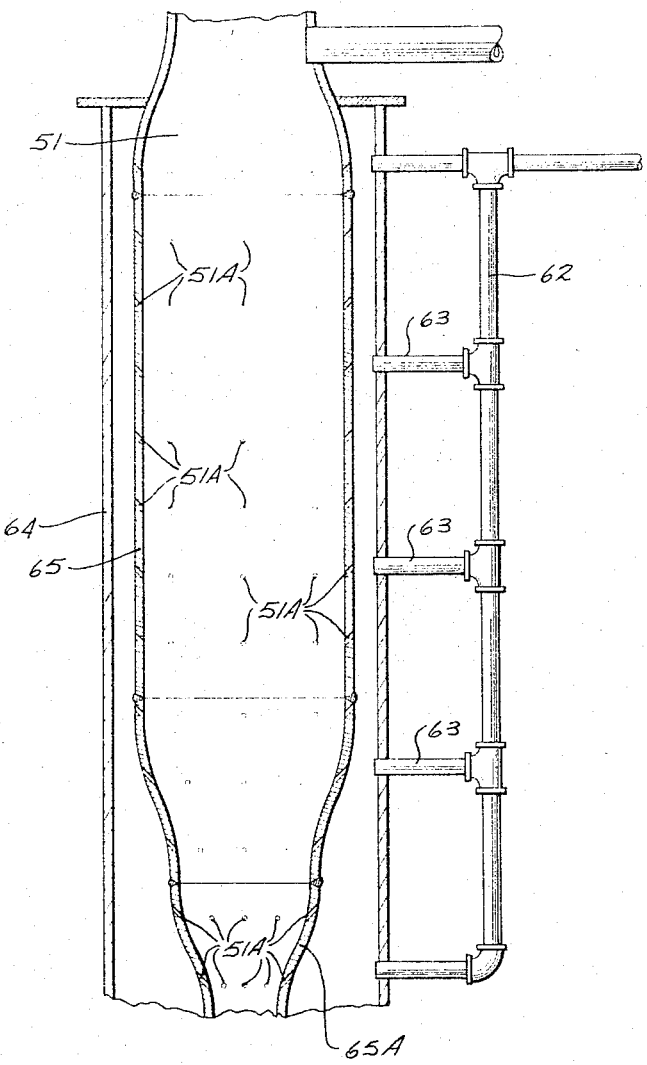
FIG. 3 is a fragmentary detail, in partial section, of a portion of the feed system of FIG. 2.

As is best shown in FIG. 3, it is preferred the plurality of passages 51A have a downward slope; for example, on the order of about 45° relative to the longitudinal axis of the tubular member 65, in order to assist the forceful downward ejection of the granular material from the chamber 51. Also, particularly when the tubular member 65 is circular in cross section, it is preferred the bottom 65A converges inwardly in easy stages which are somewhat bell-shaped in cross section. This gentle convergence serves as a nozzle-like opening from the chamber 51, to thereby obtain more velocity in the discharging granular brickmaking material without any substantial impedance to the flow of such material. The discharge 65A is also preferably of greater diameter than the diameter of valve 72 and flexible conduit 73, to still further increase velocity.

Our preferred discharge head is shown in FIGS. 4 through 7, to include the apertured plate 90 having a flat lower surface 91, and substantially centrally through which opens the downwardly converging slot 92. The preferred length and central positioning of slot 92, relative to plate 90, is best seen in FIG. 5. Attached about the periphery of the plate 90 is the downwardly-opening channel 93, in which is positioned the resilient seal 94. A plurality of apertures 95 open through the plate 90 at spaced intervals. The openings are countersunk from the bottom, to a point intermediate their ends to provide a seat 96 upon which rests a screen 97 (see FIG. 7). Each of the openings includes one of these screens, and they prevent escape of fine dusts and the like from the charge as it is blown into the press cavity 12.

A smoothly bending tubular member 100 is interconnected to the plate 90 in aligned position above the slot 92. The bend is about 90°. The internal dimensions of the tubular member 100 are substantially the same as those of the upper mouth of slot 92. At its other end, a rearwardly diverging duct 101 is attached to member 100. The duct 101 has a tubular rear fitting or section 102 which is arranged for interconnection with the flexible conduit 73, as by clamping or by attaching to a suitably threaded nipple which can be engaged by a compatible fitting on the end of a conduit 73. A pair of spaced diverter plates 103 and 104 are positioned within the duct 101. These diverter plates 103 and 104 are spaced forwardly of the discharge from fitting 102, and diverge in the direction of the member 100. These plates assist in distributing the granular brickmaking material substantially uniformly across the member 100, for even discharge through the slot 92 to the brick press cavity 12.

In preferred construction, a second plate 110 is rigidly attached to the member 100 above and parallel to plate 92, and is arranged to deflect air venting through the apertures 95. A stiffener plate 111 is rigidly attached between the plate 90 and the plate 110, and the under surface of the member 100, for added strength.

While illustrating our invention in connection with a Boyd-type mechanical press, it is readily applicable to other presses, whether mechanical or hydraulic type. It is also applicable to vibration methods of forming. Also, the changes necessary in the brickmaking machine, for purposes of installing the apparatus of this invention, are relatively minor and inexpensive. For example, the apparatus of the invention is arranged for unitary mounting on its own supporting structure, as shown in FIG. 1, which may be bolted to the rear of the brickmaking machine or attached to the floor there adjacent. Further, by using long flexible conduits, in place of conduit 73, the apparatus may be positioned still further distant from the brick press. Most presses already include a cylinder such as cylinder 26 which is attached to and arranged to move a conventional charge box into position over the cavity 12. Thus, all the modification necessary is to substitute a discharge head according to this invention for the press charge box, without other modification of the machine.

The granular batches normally used in forming brick by power pressing are by no means fine powders. This class of ware, instead, uses graded mixtures of particle sizes from as coarse as 4 mesh down to much finer grains. By way of example, a batch made from 70% flint clay and 30% semihard or plastic clay will commonly show these grain sizes: 30% passing through 4 mesh and held by 10 mesh, 20% passing through 10 mesh and held by 28 mesh, 15% passing through 28 mesh and held by 65 mesh, and 35% passing through 65 mesh; the screens referred to being of the standard Tyler series. The industry practices wide latitude in this matter, but for the general class of ware made on a brick press, there would always be some material held on a 14 mesh screen. This distinguishes from the quite unrelated art of making such small pressed shapes as electrical porcelain, which would contain no material coarser than 14 mesh; nor generally any particles coarser than even 65 mesh screen. These matters are critical in mold charging problems, since the very fine powders tend to flow like water and, therefore, present only minimum difficulties.

Having thus described the invention in detail and with sufficient particularity as to enable those skilled in the art to practice it, what we desire to have protected by Letters Patent is as set forth in the following claims.

We claim:
1. The method of manufacturing a plurality of refractory shapes of substantially uniform density on a brickmaking machine having at least one brickmaking cavity, which comprises the steps of:
    (A) preparing a size-graded refractory brickmaking mixture of refractory brickmaking material, said mixture characterized by substantial uniformity of materials makeup,
    (B) continuously removing smaller but separate batches from the mixture, said batches being substantially identical in weight and materials makeup, and delivering said batches one at a time to a stationary closable chamber,
    (C) closing said chamber and entraining a contained batch in a fluid carrier medium, there being a movable distributing nozzle interconnected with said stationary chamber and arranged to move from a position spaced away from said brickmaking cavity to a sealed position over said brickmaking cavity,
    (D) moving said distributing nozzle over said cavity and into sealing relationship therewith,
    (E) conveying an entrained batch from said closed chamber to said distributing nozzle substantially without loss of any material from the batches,
    (F) charging said conveyed entrained batch through said distributing nozzle substantially uniformly across the bottom of the cavity while allowing escape of the fluid carrier medium from the cavity,
    (G) moving said nozzle away from said brickmaking cavity,
    (H) actuating the brickmaking machine to make a shape from the batch distributed in the cavity, and
    (I) subsequently conveying other substantially identical entrained batches, one at a time, from the closable chamber through said nozzle to said cavity and making shapes therefrom.

2. The method of claim 1 in which said fluid carrier medium is a pressurized gas.

References Cited by the Examiner

UNITED STATES PATENTS

| | | | |
|---|---|---|---|
| 2,825,107 | 3/1958 | Schueler | 264—121 |
| 3,028,625 | 4/1962 | Dawson | 264—121 XR |
| 3,098,695 | 7/1963 | Jurgeleit | 25—103 XR |
| 3,164,649 | 1/1965 | Poole et al. | 264—121 |
| 3,195,958 | 7/1965 | Goins | 264—121 |

FOREIGN PATENTS 400,280   10/1933   Great Britain.

ROBERT F. WHITE, *Primary Examiner.*

J. A. FINLAYSON, *Assistant Examiner.*